United States Patent [19]

Powell et al.

[11] 4,209,024

[45] Jun. 24, 1980

[54] AXIAL FLOW COMBINE WITH IMPROVED INLET TRANSITION AREA

[75] Inventors: Thomas E. Powell; Edward Donaldson, both of Brantford, Canada

[73] Assignee: White Motor Corporation of Canada Limited, Brantford, Canada

[21] Appl. No.: 2,299

[22] Filed: Jan. 10, 1979

[30] Foreign Application Priority Data

Oct. 31, 1978 [CA] Canada .................................. 315530

[51] Int. Cl.² ............................................. A01F 7/06
[52] U.S. Cl. ................................... 130/27 T; 56/14.6
[58] Field of Search ............. 56/14.6; 130/27 R, 27 T

[56] References Cited

U.S. PATENT DOCUMENTS

| 3,664,100 | 5/1972 | Rowland-Hill | 56/14.6 |
| 3,848,609 | 11/1974 | Mortier et al. | 130/27 T |
| 3,994,304 | 11/1976 | Todd et al. | 130/27 T |

*Primary Examiner*—Russell R. Kinsey
*Attorney, Agent, or Firm*—Lockwood, Dewey, Alex & Cummings

[57] ABSTRACT

In an axial flow combine, an improved inlet transition area for changing the flow of crop materials from a linear ribbon-like flow through the feeder to an arcuate ribbon-like flow about the flighting of the inlet end of the rotor to a helical sleeve flow between the rotor and rotor casing while at the same time injecting crop materials in all portions of the flighting. A sloping ramp extends upwardly and rearwardly from the feeder to an elliptical intersection with the rotor casing. A pair of oppositely disposed sidewalls in generally perpendicular relation to the ramp extend from the feeder and converge about the inlet end of the rotor at an upper portion of the rotor casing. Another wall between the sidewalls, oppositely disposed from the ramp, encloses the inlet transition area. A rotary beater disposed between the sidewalls and in close proximity to the inlet end of the rotor rotates at a higher tangential velocity than the feeder to direct and accelerate the crop materials upwardly and rearwardly along the sloped ramp and the converging sidewalls to entrain the crop materials about all portions of the flighting of the rotor in an arcuate ribbon-like manner. All of the surfaces of the inlet transition area are either planar or cylindrical for ease and economy of manufacture and fabrication. Related methods are disclosed.

7 Claims, 5 Drawing Figures

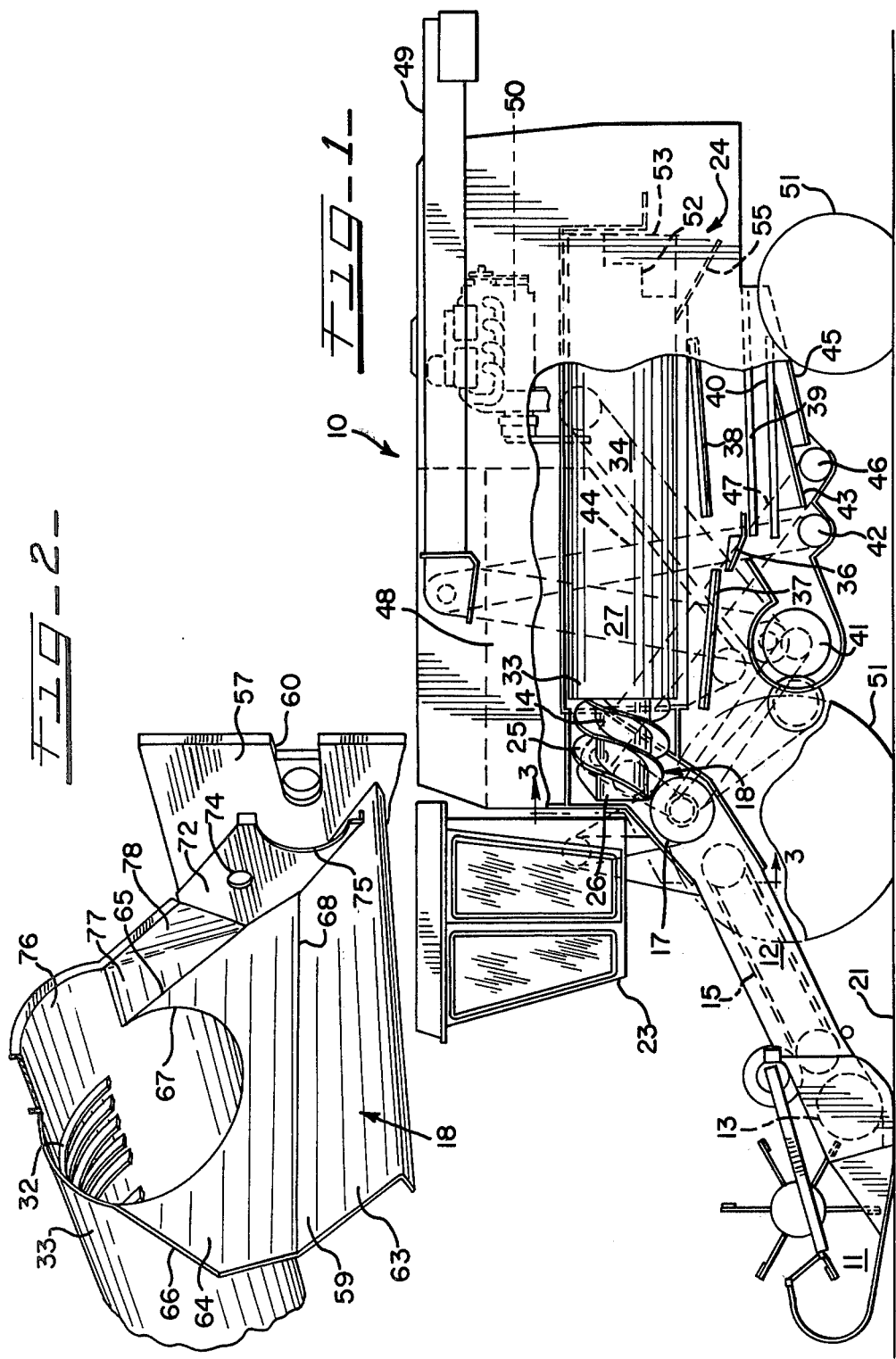

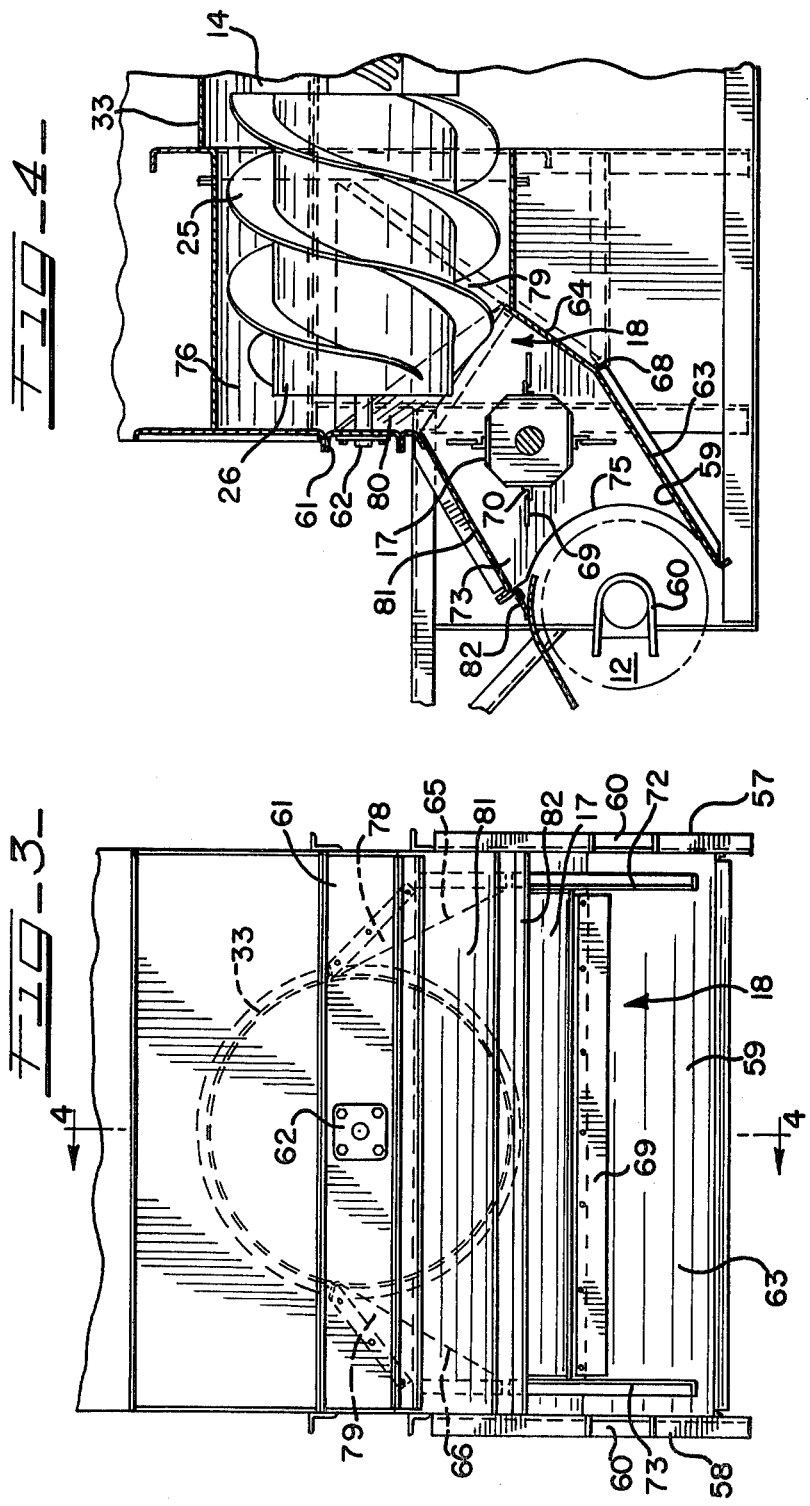

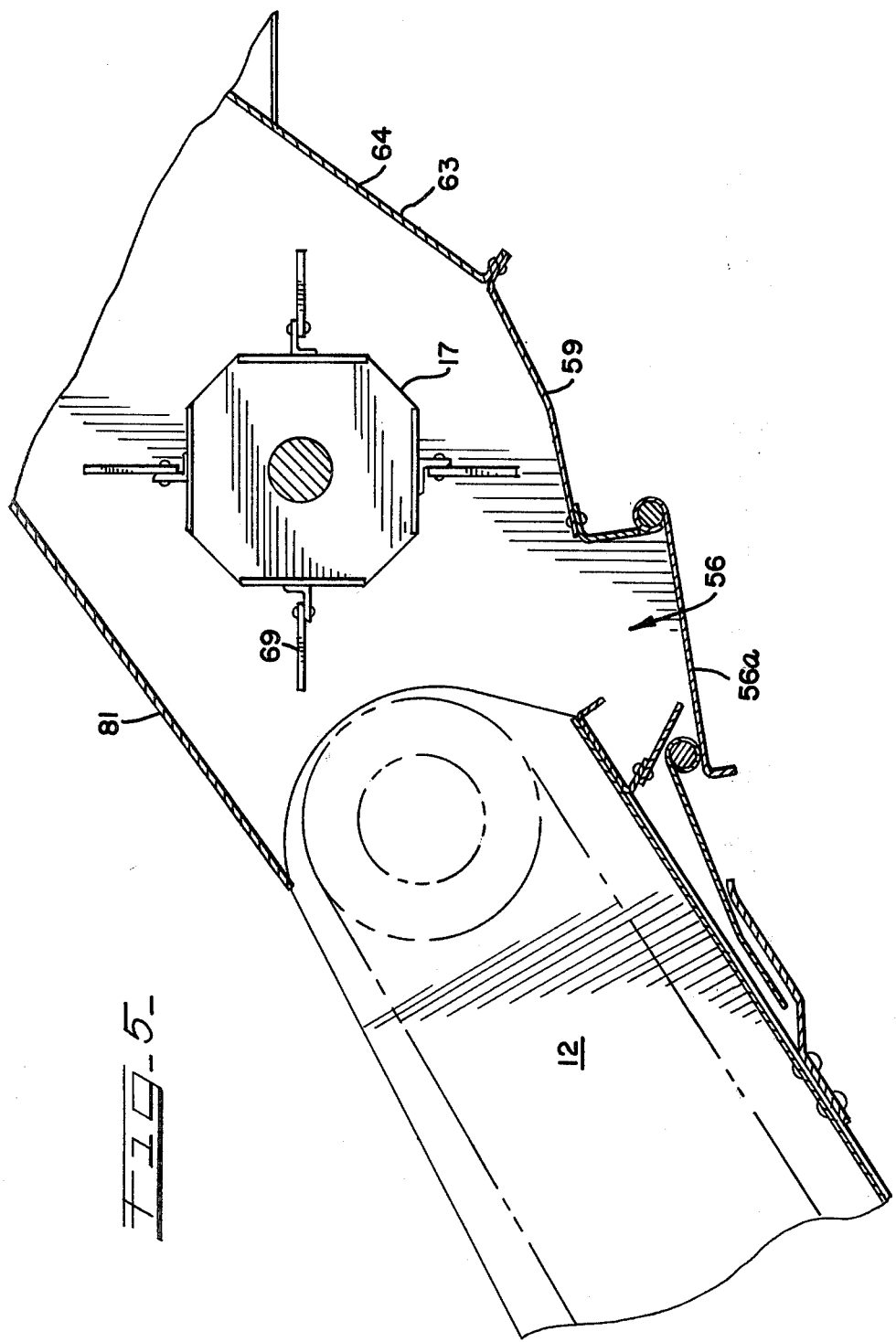

AXIAL FLOW COMBINE WITH IMPROVED INLET TRANSITION AREA

This invention relates to an improved inlet transition area in an axial flow combine disposed between the feeder portion and the rotor longitudinally housed in a rotor casing wherein the flow of crop materials is changed from linear ribbon-like through the feeder to arcuate ribbon-like between flights on the rotor inlet end to a helical sleeve between the rotor and rotor casing, and is more particularly concerned with an upwardly and rearwardly sloping ramp extending from the feeder and intersecting with the rotor casing, a pair of sidewalls extending from the feeder and converging about the inlet end of the rotor, means oppositely disposed from the ramp between the sidewalls for enclosing the inlet transition area, and rotary means disposed between the sidewalls in proximity to the inlet end of the rotor for directing crop materials upwardly and rearwardly from the feeder along the ramp portion and converging sidewalls to entrain the crop materials in the flighting about the inlet end of the rotor. All of the surfaces in the inlet transition area are fabricated from sheet stock into pieces that are either planar or curved in only one direction for ease and economy of manufacture and fabrication.

A number of types of axial flow combines for harvesting various types of agricultural crops are known to the prior art. Such combines have a generally cylindrical threshing and separating rotor longitudinally and coaxially disposed in the combine in a rotor casing, including a concave, for removing grain or corn from the stems, stalks, cobs or the like of the crop materials. The crop materials are severed and gathered by a header, including a reciprocating sickle or snapping rolls. The gathered materials then begin movement upwardly from the header, which is generally located close to the ground, toward the interior of the combine to begin the threshing and separating operations. Since flow of the crop materials through the feeder is usually linear and movement of the crop materials about the rotor in threshing and separating areas is helical, an inlet transition area is generally disposed between the feeder and the threshing area of the rotor to redirect the flow of crop materials from linear to helical.

Change of the crop material flow from linear to helical in the inlet transition area must accommodate a wide variety of crop materials such as ears of corn, various types of cereal grains such as wheat and oats and pod-bearing plants such as soybeans. These various types of crops can also vary widely in physical characteristics such as in moisture content, size, fibrous content, brittleness, and the like.

The inlet transition area is usually the bottleneck in the flow of materials through an axial flow combine and therefore limits the crop handling capacity of such combines. The inlet transition area must therefore be designed to accommodate all of these varying conditions without causing plugging or blockages in the inlet transition area and yet deliver a relatively uniform density of crop materials at high capacity to the rotor. Axial flow combines are generally more efficient in removing grain or corn from the corresponding crop materials when the flow of materials through the axial flow combine, about the rotor, is as uniform as possible.

Many different approaches have been taken to change the flow of crop materials in the vicinity of the inlet end of the rotor in an axial flow combine. The crop materials have sometimes been fed directly from the discharge end of the feeder to the inlet end of the axial rotor. Since some of these feeders are of the conveyor or elevator type, the flow of crop materials leaving the feeder has not been at a sufficient velocity to uniformly entrain the crop materials in the flighting on the end of the rotor without formation of wads or bunches of crop material which jam the rotor. Other prior art machines have utilized specially shaped or contoured surfaces in the transition area between the feeder and the inlet end of the rotor which require special shaping or contouring manufacturing operations and more complex and expensive manufacturing equipment, stamping, dies, tooling and the like. Othe prior art efforts have been concerned with means for positively entraining the crop materials at the end of the feeder adjacent the inlet end of the rotor such as by horizontal injection of crop materials into the rotor flighting whereby the crop materials are picked up by edge engagement. This technique also tends to provide wads or bunches of material to the rotor as each successive flighting blade begins to pick up the accumulated crop materials from the end of the feeder.

The object of the present invention, generally stated, is to provide a high capacity inlet transition area for changing the flow of crop materials from linear ribbon-like flow through the feeder to arcuate ribbon-like flow between flights on the inlet end of the rotor to helical flow about the rotor in the threshing area while providing a relatively uniform density of crop materials, with combinations of planar and/or one-direction curved and cylindrical surfaces which converge about the inlet end of the rotor.

A principal object of the present invention is therefore to provide a novel and improved inlet transition area which provides a relatively uniform density of crop materials about the inlet end of the rotor for more efficient threshing and separating of grain, corn, beans or the like from the crop materials without clogging, blockage or related problems associated with changing the flow of high volumes of materials from linear through the feeder to helical about the rotor.

Another object of the present invention is to provide an inlet transition area having exclusively planar and cylindrical surfaces to avoid the manufacturing difficulty and attendant loss of economy in forming specially shaped and contoured surfaces in the inlet transition area.

Yet another object is to provide a ramp, which slopes primarily upwardly rather than rearwardly, extending from the feeder to an elliptical intersection with the rotor casing and a pair of oppositely disposed sidewalls in generally perpendicular relation to the ramp portion which extend from the feeder and gradually converge about the inlet end of the rotor, above the longitudinal axis of the rotor on both sides, at an upper portion of the rotor casing such that the crop materials are directed and accelerated primarily upwardly, but also rearwardly, along the sloped ramp and converging sidewalls to inject the crop materials between the flighting of the rotor.

Another object of the invention is to provide a rotay beater adapted to operate at a higher tangential velocity than the feeder for directing the crop materials upwardly and rearwardly along the ramp portion and converging sidewalls into the flighting of the rotor.

The objects and advantages of the invention, and others, including those inherent in the invention, are accomplished by an inlet transition area disposed between the feeder and the inlet end of the rotor in an axial flow combine with an upwardly and rearwardly sloping ramp of planar sections extending from the feeder and intersecting with the cylindrical rotor casing and with a pair of spaced apart sidewalls extending from the feeder and gradually converging about the inlet end of the rotor in a generally tangential manner to the upper portion of the rotor casing and in close proximity to the flighting about the inlet end of the rotor. Another wall is disposed opposite the ramp between the pair of oppositely disposed sidewalls for enclosing the inlet transition area. A rotary beater is mounted beween the sidewalls in the inlet transition area in proximity to the inlet end of the axial rotor and is adapted to operate at a higher tangential velocity than the feeder to direct and accelerate the crop materials upwardly and rearwardly along the inclined ramp and converging sidewalls to entrain high volumes of crop materials in the flighting of the rotor. The ramp sidewalls and other surfaces in the inlet transition area are either planar or cylindrical surfaces for ease and economy of manufacture.

The ramp preferably defines two planar portions, a first planar portion extending from the feeder means rearwardly and upwardly to an intersection line with a second planar portion. The second planar portion extends rearwardly and upwardly from the intersection line to intersect with the rotor casing in an elliptical intersection. The first and second ramp portions are out of planar alignment along the intersection line by an angle of less than 30 degrees, with the intersection line disposed tangentially along the rotary beater such that the rotary beater comes close to making tangential contact with both the first and second planar ramp portions for better acceleration of the crop materials through the inlet transition area toward the rotor.

The diameter of the auger and the depth of flighting about the inlet end of the rotor must be sufficient to accommodate high volumes of crop material when the rotor is turning at typical threshing speeds.

The features of the present invention, which are believed to be novel and patentable, are set forth with particularity in the appended claims. The invention, together with the further advantages thereof can best be understood by reference to the following description taken in conjunction with the accompanying drawings, in which like reference numerals identify like reference elements, and in which:

FIG. 1 is a partly broken away side elevational view, illustrating the general physical arrangement of an axial flow combine in accordance with the present invention wherein the inlet transition area is disposed between the feeder portion of and the inlet end of the rotor;

FIG. 2 is a fragmentary, broken away perspective view, taken substantially in elevation, of the inlet transition area of the axial flow combine of FIG. 1 illustrating the upwardly and rearwardly sloping ramp intersecting the rotor casing and one of the sidewalls converging with a portion of the rotor casing;

FIG. 3 is a front elevational view taken on line 3—3 of FIG. 1 illustrating the inlet transition area at the feeder end;

FIG. 4 is a side elevational view taken in section along line 4—4 of FIG. 3, also illustrating the inlet transition area between the feeder and the inlet end of the rotor; and FIG. 5 is a side elevational view partly diagrammatic, related to FIG. 4 illustrating a stone trap disposed between the feeder and the inlet transition area.

Referring to FIG. 1, there is shown a crop harvesting combine, generally designated 10, of the axial flow type. A front header portion 11 floats along the soil surface 21 to sever crops close to the ground. Different headers may be provided for different types of crops, such as corn headers, pickup headers or straight cut headers. A feeder 12 conveys the crop materials to be threshed and separated from a header auger 13 to an axial flow rotor 14. Elevating and conveying means 15 disposed in the feeder 12 convey crop materials from the header 11 to the rotor 14. The elevating and conveying means 15 operates at a sufficient velocity to adequately move the maximum anticipated crop volume from the auger 13 through a feeder 12. An inlet beater 17 rotates at a higher tangential velocity than the elevating and conveying means 15 to accelerate the crop materials for delivery into the inlet transition area 18. The feeder 12 is removably mounted to the combine 10 near the axis of the beater 17 by a hinge-like and pivotal connection which permits the header 11 to have a floating action to conform to variations in the soil surface 21.

Generally disposed above the feeder 12 is a windowed cab 23 containing various operating controls (not shown) for observing and controlling the crop harvesting operation of the combine 10.

The rotor 14 is longitudinally and horizontally disposed in the combine 10 and is of sufficient axial dimension to extend from the inlet transition area 18 to a discharge area 24 at the rear of the combine 10. As will be discussed in more detail hereinafter, the flow of crop materials changes in the inlet transition area 18 from axial or straightline ribbon-like flow through the feeder 12 to an arcuate ribbon-like flow about the flighting 25 on the inlet end 26 of the rotor 14 to helical flow in the threshing area 27 and separating area 34 of the rotor 14. Helical flighting 25 is disposed about a reduced diameter auger portion at the inlet end 26 of the rotor 14 to entrain crop materials therebetween and begin the helical movement about the rotor 14. The auger diameter and the depth of flighting must be sufficient to accommodate high crop volumes between the flighting when the rotor 14 is turning at typical threshing speeds. The crop materials are delivered by the flighting 25 to a frusto-conical portion of the rotor 14 whereat the crop materials are trapped between the conical portion and the concave or guide vanes 32 (FIG. 2) of the rotor casing 33. The crop materials are then forced or cammed out radially by the conical portion and positively moved by the guide vanes 32 into the threshing area 27 whereat a plurality of threshing elements (not shown) on the rotor 14 cause the crop materials to undergo shear and impact forces between the threshing elements and the concave of the rotor casing 33. The guide vanes 32, which are helically disposed in relation to the longitudinal axis of the rotor 14 about the top of the rotor casing 33, cause progressive rearward movement of the crop materials axially along the rotor 14.

Upon movement of the crop materials into a separation area 34, the materials continue to be subjected to a threshing action between the rotor 14 and the rotor casing 33. Grain or the like from the threshing area 27 falls to an oscillating grain pan 37 and grain or the like from the separating area 34 falls to an oscillating separating pan 38, with the pans 37, 38 in cascading relationship to a pair of cascading chaffer pans 36, 39 and a sieve pan 40. A blower 41 provides a source of air flow to aid in the chaffing and sieving operations such that clean grain is delivered to a grain auger 42 by an inclined grain pan 43 disposed below a portion of the sieve pan 40. Mixed grain and other crop component materials are delivered by another inclined pan 45, generally disposed below portions of the chaffer pan 39 and sieve pan 40, to a separation auger 46 for return to the inlet transition area 18 by means of an elevator 47 for rethreshing by the rotor 14. The grain auger 42 delivers clean grain through an elevator 44 to a pair of saddle-type grain tanks 48 disposed along both sides of the rotor 14 for temporary storage of grain in the combine 10 or for discharge of the grain from the combine through a discharge duct 49.

An internal combustion engine 50 disposed near the rear of the combine above the rotor casing 33 provides the motive power for the various moving elements of the combine 10 including at least a pair of the wheels 51.

It was previously noted that the rotor 14 extends from the inlet transition area 18 longitudinally through the combine to the discharge area 24. The rotor casing 33 likewise extends co-axially about the rotor 14 through the combine to the discharge area 24 whereat portions of the rotor casing 33 are cutout, as indicated at 52, about the discharge end 53 of the rotor 14 for discharging the threshed and separated crop materials onto a deflecting plate 55 for rearward deflection and spreading onto the ground across the body width of the combine 10.

With reference to FIGS. 2, 3 and 4, various views of the inlet transition area 18 are illustrated. A pair of spaced apart and parallel exterior sidewalls 57, 58 (FIG. 3) have mounted therebetween an upwardly and rearwardly sloping ramp 59. The exterior sidewalls 57, 58 are each provided with a U-shaped flange 60 along a forward edge thereof for receiving the rearwardmost and uppermost end of the feeder 12. The flange 60 provides a hinge-like or pivotal connection such that the header 11 and feeder 12 may pivot thereabout to conform to soil surface variations and irregularities as previously described.

A stone trap 56 (FIG. 5) may extend transversely between the upper end of the floor of the feeder 12 and the lower end of the ramp 59 for receiving stones from the crop materials to prevent internal damage to the combine 10, especially to the rotor 14 or the casing 33. A door 56a may be manually opened to discharge accumulated stones.

A horizontally disposed channel shaped beam 61 (FIG. 3) extends between the sidewalls 57, 58 at a position above the ramp 59 for supporting the inlet end 26 of the rotor 14 by a bearing 62 secured to the beam 61.

The upwardly and rearwardly sloping ramp 59 consists of a lower ramp portion 63 and an upper ramp portion 64. Both of the ramp portions 63, 64 are planar surfaces with the lower ramp portion 63 being of substantially rectangular shape and the upper ramp portion 64 being of special configuration or shape with respective edges 65, 66 converging toward the cylindrical rotor casing 33 in an approximately tangential manner at points above the longitudinal axis of the rotor 14. The upper ramp portion 64 also intersects with the rotor casing 33 at an obtuse angle thereby defining a portion of an elliptical intersection or edge 67 (FIG. 2) between the upper ramp portion 64 and the rotor casing 33. The upper ramp portion 64 is typically inclined at an angle of 55 degrees to the horizontal for directing the crop materials more upwardly than rearwardly into the flighting 25, while the lower ramp portion is at an angle of 33 degrees to the horizontal and at an angle of 22 degrees to the upper ramp portion 64.

The intersection line 68 between the lower ramp portion 63 and the upper ramp portion 64 is preferably disposed along an approximately tangential location to the cylindrical surface of revolution defined by the inlet beater 17. Blades 69 on the inlet beater 17 come close to making tangential contact with both the lower and upper ramp portions 63, 64 in the vicinity of the intersection line 68 to enhance the performance of the inlet beater 17 in directing and accelerating crop materials upwardly and rearwardly along the ramp portions 63, 64 from the feeder 12 to the flighting 25 about the inlet end 26 of the rotor 14.

A pair of interior sidewalls 72, 73 are disposed in a parallel and spaced apart relationship between the exterior sidewalls 57, 58 and in proximity thereto. Each of the sidewalls 72, 73 is provided with an aperture 74 for rotatably mounting the inlet beater 17 therebetween. When the feeder 12 is mounted in the U-shaped flanges 60, a forward arcuate edge 75 defined in each of the interior sidewalls 72, 73 receives the discharge end of the feeder 12 in proximity thereto such that all of the crop materials from the feeder 12 are fed into the inlet transition area 18 between the interior sidewalls 72, 73. Extensions of the sidewalls 72, 73 converge toward an upper portion 76 of the rotor casing 33 in an approximately tangential manner by means of triangular sidewalls segments 77, 78 (FIG. 2) associated with the sidewall 72 and with triangular sidewall segments 79, 80 (FIG. 4) associated with the sidewall 73. The respective triangular sidewall segments 77, 79 are generally perpendicular to the upper ramp portion 64, as are the interior sidewalls 72, 73. The other triangular sidewall segments 78, 80, which interconnect the respective segments 77, 79 with the sidewalls 72, 73, are angularly disposed to the sidewalls 72, 73, the segments 77, 79 and the upper ramp portion 64, also in a converging manner toward the upper portion 76 of the rotor casing 33. Each of the triangular segments 77, 78, 79, 80 are planar, while the upper portion 76 of the rotor casing 33 is a portion of a cylindrical surface.

Disposed immediately below the horizontal beam 61 is another planar panel 81 (FIGS. 3 and 4) in an approximately parallel and spaced apart relationship from the lower ramp portion 63. A lip 82 of rubber or similar material may be disposed along a forwardmost edge of the panel 81 for sealing against the feeder 12.

It is therefore seen that the inlet transition area 18 constitutes a converging passageway from the approximately rectangular opening at the feeder 12 defined by the lower ramp portion 63, the interior sidewalls 72, 73 and the panel 81. This passageway of approximately rectangular cross section begins to converge about the inlet flighting 25 of the rotor 14 at the triangular sidewall segments 77, 78, 79, 80 and the special shape of the upper ramp portion 64. It will be appreciated that the triangular sidewall segments 77, 79 can either intersect the upper portion 76 of the rotor casing 33 above the longitudinal axis of the rotor 14, or the upper portion 76 may be an integral extension of the sidewall segments 77, 79.

It will be further appreciated that the inlet transition area 18 of the present invention requires only planar or cylindrically curved surfaces which are easy and economical to fabricate from sheet metal stock. Special tooling in the form of stamping dies or the like to create specially curved or contoured surfaces are not required. Furthermore, fabrication of the individual components of the transition area 18 are easily accomplished by means of threaded connectors, rivets, welding or the like.

The inlet transition area 18 of the present invention also provides a good degree of uniformity in injecting high volumes of crop materials upwardly into the flighting 25 about the rotor 14. Due to the converging nature of the transition area 18 about the flighting 25 on the inlet end of the rotor 14, the inlet beater 17, which operates at a higher tangential velocity than the feeder 12, is able to inject the crop materials about all portions of the flighting 25 rather than just along the lower portion of the rotor casing 33 where the casing 33 intersects the upper ramp portion 64, as in the edge engagement techniques of prior art combines. The upwardly sloping nature of the inlet transition area 18 also presents more of the flighting 26 for injecting the crop materials thereabout.

While the crop materials are injected about all portions of the helical flighting 25, the crop density thereabout is not entirely uniform through 360 degrees due to wind currents created by rotation of the flighting and rotor speed. It has been found that the greater density of materials occurs in those portions of the flighting 25 between approximately one o'clock and seven o'clock as viewed from the front of the combine 10. The reduced diameter of the auger core and the depth of the flighting 25 must therefore be chosen to accommodate the volume of crop material delivered by the inlet beater 17 at the low crop pressures required to successfully inject the materials about the flighting 25 by the beater 17.

It will be understood that various changes and modifications may be made without departing from the spirit of the invention as defined in the following claims.

We claim:

1. In an axial flow combine adapted to receive header means for harvesting crop materials, said combine having a cylindrical rotor casing including a concave and a rotor longitudinally disposed in said rotor casing, said rotor and concave adapted for threshing and separating the crop materials, said rotor having an inlet portion with helically disposed flighting thereabout for moving crop materials into said rotor casing about the rotor, said combine further having feeder means for transporting the crop materials from the header means toward the rotor and rotor casing, said axial flow combine further having an inlet transition area defined by planar and cylindrical surfaces and disposed between said feeder means and said rotor casing with at least a portion of the inlet end of said rotor extending into the inlet transition area, the improvement in said inlet transition area comprising:

an upwardly and rearwardly sloping planar ramp extending from said feeder means to a connection with said casing along which crop materials may be directed toward the inlet end of said rotor;
a pair of spaced apart planar sidewalls shielding opposite ends of said feeder means,
planar extensions of said sidewalls converging about the inlet end of said rotor in a generally tangential manner to said rotor casing;
means disposed above said ramp between said pair of sidewalls for further defining said inlet transition area; and rotary means disposed between said sidewalls in said inlet transition area in proximity to the inlet end of said rotor, said rotary means adapted to operate at a higher tangential velocity than said feeder means to accelerate said crop materials primarily upwardly, but also rearwardly, in said inlet transition area along said ramp and said converging sidewalls to feed the crop materials into the flighting about the inlet end of the rotor.

2. The axial flow combine as in claim 1, wherein said ramp comprises first and second planar portions, said first planar portion extending from said feeder means rearwardly and upwardly to intersect along a generally horizontal intersection line with said second planar portion, the second planar portion extending rearwardly and upwardly from the intersection line to intersect with said rotor casing, said first and second portions being angularly displaced by an angle of less than 30 degrees along said intersection line.

3. The axial flow combine as in claim 2 wherein the intersection line between said first and second planar portions of the ramp lies tangentially in proximity to a surface of revolution defined by said rotary means.

4. The axial flow combine as in claim 1 wherein said intersection between said ramp and said rotor casing defines a portion of an ellipse.

5. The axial flow combine as in claim 1 having a pair of exterior sidewalls and wherein said inlet transition area is disposed between said pair of exterior sidewalls, said exterior sidewalls each provided with a U-shaped aperture for removably receiving said feeder means therein.

6. The axial flow combine of claim 1 wherein the flighting on the inlet end of the rotor is tapered to define a frusto-conical surface of revolution such that said rotary means may be disposed in closer proximity to said rotor in said inlet transition area.

7. In an axial flow combine adapted to receive header means for harvesting crop materials, said combine having a cylindrical rotor casing including a concave and a rotor longitudinally disposed in said rotor casing, said axial rotor and concave adapted for threshing and separating the crop materials, said rotor having an inlet end with helically disposed flighting thereabout for moving crop materials into said rotor casing, said axial flow combine further having feeder means for transporting the crop materials from the header means toward the rotor and concave, said axial flow combine further having an inlet transition area defined by planar and cylindrical surfaces disposed between said feeder means and said concave, the improvement in said inlet transition area comprising:

a lower portion of the casing, about the inlet end of said rotor broken away to expose the flighting about the inlet end of the rotor;
an upwardly and rearwardly sloping planar ramp extending from a lower and forward end at said feeder means and intersecting at an upward and rearward end with said rotor casing;
a pair of oppositely disposed planar sidewalls in generally perpendicular relation to said ramp portion,
planar extensions of said sidewalls converging about the inlet end of said rotor in a generally tangentially manner to said rotor casing;
means disposed oppositely from said ramp portion between said pair of sidewalls for enclosing said inlet transition area; and rotary means disposed between said sidewalls in proximity to the inlet end of said rotor, said rotary means adapted to operate at a higher tangential velocity than said feeder means for directing and accelerating crop materials primarily upwardly, but also rearwardly, along said ramp and said converging sidewalls to inject the crop materials about the helical flighting on the inlet end of the rotor.

* * * * *